July 5, 1949.  H. A. WILSON  2,474,877
ATTACHMENT FOR MILLING MACHINES
Filed Aug. 3, 1945  2 Sheets-Sheet 1

INVENTOR
HOWARD A. WILSON
BY Ralph L Chappell
ATTORNEY

July 5, 1949.  H. A. WILSON  2,474,877
ATTACHMENT FOR MILLING MACHINES
Filed Aug. 3, 1945  2 Sheets-Sheet 2
FIG. 6.
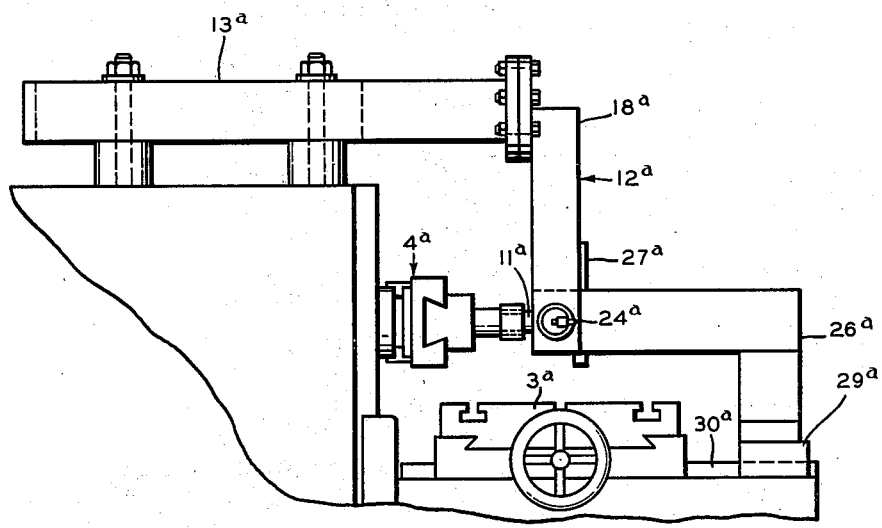
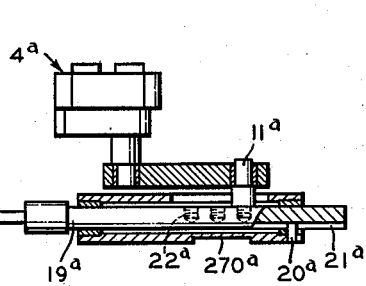
FIG. 8.
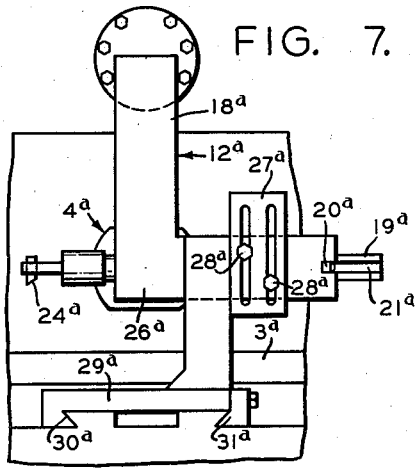
FIG. 7.
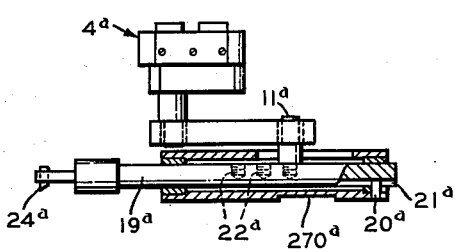
FIG. 9.
INVENTOR
HOWARD A. WILSON
BY Ralph L. Chappell
ATTORNEY Patented July 5, 1949

2,474,877

UNITED STATES PATENT OFFICE 2,474,877

ATTACHMENT FOR MILLING MACHINES

Howard A. Wilson, Jamaica Plains, Mass.

Application August 3, 1945, Serial No. 608,823

5 Claims. (Cl. 90—44)

(Granted under the act of March 3, 1883, as amended April 30, 1928; 370 O. G. 757)

My invention relates to an attachment for a milling machine. It has to do, more particularly, with an attachment for a milling machine which may be used for slotting operations.

It is customary to use a milling machine for the usual milling operations and a separate machine of a different type for the usual slotting operations. In a small machine shop, the necessity of having the two separate relatively costly machines is quite a financial burden.

The object of my invention is to provide a simple, low cost and efficient attachment for a standard milling machine which will convert the machine into a slotter that can be used effectively on vertical or horizontal slotting jobs.

The preferred embodiment of my invention is illustrated in the accompanying drawings wherein similar characters of reference designate corresponding parts and wherein:

Fig. 6 is a side elevational view of the attachment for use in horizontal slotting operations.

Fig. 7 is an end elevational view of the attachment shown in Fig. 6.

Fig. 8 is a horizontal sectional view through the slotter of Fig. 6 showing the slotting tool at one extreme of its horizontal movement.

Fig. 9 is a view similar to Fig. 8 but showing the slotting tool at the other extreme of its horizontal movement.

Figure 1:
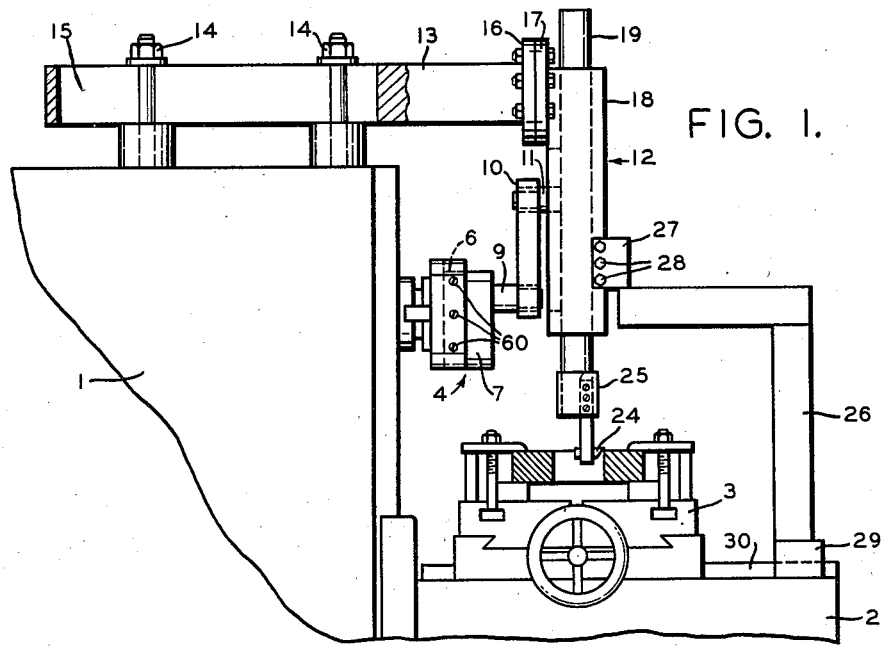
Fig. 1 is a side elevational view of my milling machine attachment for use in vertical slotting operations.
Figure 5:
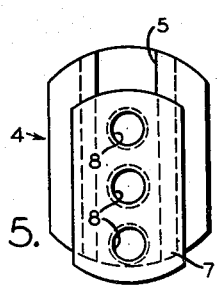
Fig. 5 is a face view of the eccentric which actuates the slotter.

With reference to the drawings, I have illustrated my slotter attachment on a milling machine of a standard type. The milling machine includes a vertical column 1 upon the forward side of which is slidably mounted for vertical movement a bed 2. The bed 2 carries a workholding carriage 3 which is slidably mounted on the bed 2 for movement in two directions at right angles to each other. The column 1 carries a forwardly projecting spindle and the usual driving mechanism and an eccentric device 4 is carried by the spindle. The eccentric 4 (Figs. 1 and 5) includes a cylindrical member which is keyed to the spindle and has a dove-tail groove 5 formed in the face thereof and extending diametrically across the face. This dove-tail groove 5 receives a similarly shaped tongue 6 formed on the inner side of a crank arm 7. The arm 7 is held in a selected adjusted position radially of the slot 5 by means of set screws 60 threaded through the wall of groove 5 into contact with the tongue 6. The crank arm 7 has a series of spaced openings 8, any one of which is adapted to receive the pivot pin 9. The pivot pin 9 is pivoted to one end of a link or pitman 10. The other end of the pitman 10 is pivoted to the pin 11 by means of which the slotter attachment 12 can be actuated.

The attachment 12, illustrated in Figs. 1 to 4, comprices a supporting arm 13 which is rigidly secured to the top of the column 1. This arm projects forwardly from the column and is adjustably mounted thereon by means of bolt and nut units 14 which cooperate with a longitudinal slot 15 formed in the arm. The forward end of the arm 13 has a disk 16 formed thereon. This disk abuts a disk 17 formed on the upper end of a vertically disposed guide 18 and is bolted thereto.

The guide 18 is of rectangular cross-section and has a rod 19 slidably mounted therein for vertical reciprocating movement. The rod is of circular cross-section but is prevented from rotating in guide 18 by means of a key 20 secured in a notch in the upper end of guide 18 and extending into the spline slot 21 extending the height of the rod 19. The pin 11 is threaded into one of a series of vertically spaced openings 22, formed in the rod 19, and projects outwardly from the rod through a vertical slot 23 formed in the rear side of guide 18. By varying the position of pin 11 on rod 19 or the position of pin 9 on arm 7, the stroke of rod 19 may be varied. The lower end of rod 19 carries a suitable cutting tool 24 which is secured removably to the rod by a suitable chuck 25.

To brace the guide 18 and hold it rigidly in position, I provide the brace 26. This brace is of inverted L-shape and extends forwardly and downwardly from the lower end of guide 18. The end of the horizontal arm of brace 26 is provided with a yoke 27 which straddles the guide 18 and which is rigidly clamped thereto by clamping bolts 28. The lower end of the vertical arm of brace 26 is provided with a clamp 29 which cooperates with the forwardly extending dovetail guide 30 that is provided on the bed 2 for the carriage 3. The clamp 29 includes a removable plate 31 which facilitates mounting and removal of the brace 26 on the bed 2. In mounting my attachment on the milling machine, the bed 2 will be adjusted to the proper vertical position on the column 1 before the brace 26 is mounted on the bed 2 and is secured to guide 18.

Figures 2, 3, 4:
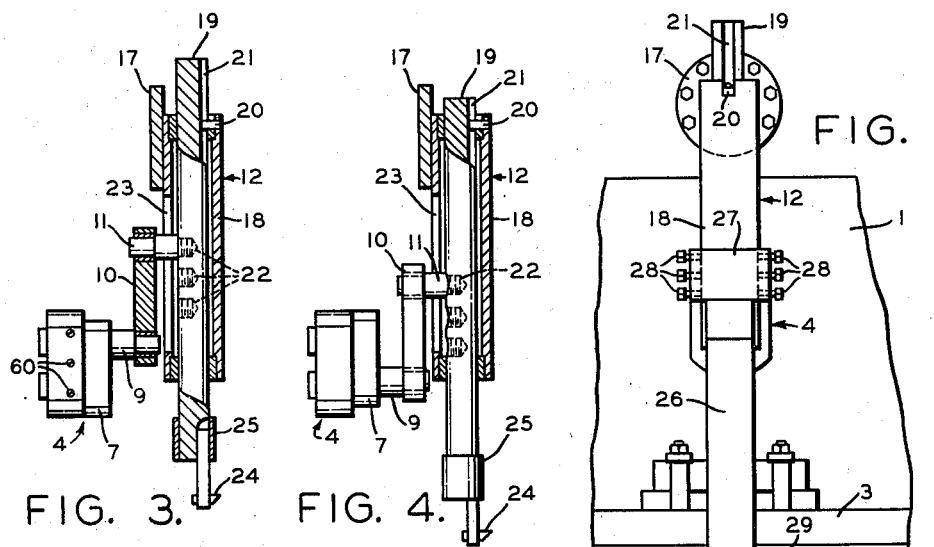
Fig. 2 is an end elevational view of the attachment shown in Fig. 1.
Fig. 3 is a vertical sectional view, partly broken away, through the slotter of Fig. 1 showing the slotting tool in its uppermost position.
Fig. 4 is a view similar to Fig. 3 but showing the slotting tool in its lowermost position.

When the slotter attachment is to be used, the work to be slotted is mounted on the carriage 3. The eccentric or driving unit 4 is actuated to vertically reciprocate the rod 19. This will move the cutting tool 24 up and down and cut the proper slot in the work. The two extreme positions of the cutting tool and associated parts are illustrated in Figs. 3 and 4. The carriage 3 may be moved on the bed 3 in both directions to properly position it relative to the slotting tool.

In Figs. 6 to 9, I have illustrated an attachment for horizontal slotting operations. Parts in these figures which are similar to those in Figs. 1 to 5 are indicated by the same reference characters plus the suffix "a".

In these figures, the attachment 12a is actuated by the eccentric unit 4a as before. The adjustable forwardly extending supporting arm 13a is secured to the guide member 18a. The guide member in this instance is of L-shape and the rod 19a is reciprocably mounted in the horizontal arm thereof. The rod 19a projects from the end of the guide and carries the cutting tool 24a. The rod is prevented from rotating in the guide by a key 20a secured to the end of the horizontal arm of the guide and extending into the spline slot 21a formed in the rod. The rod is reciprocated by the pin 11a which is threaded into any of spaced openings 22a formed in the rod.

To brace the guide 18a I provide the L-shape brace 26a. This brace has a clamp 29a on its lower end which fits over the dovetail guide 30a. The clamp includes the removable plate 31a. To secure the upper end of the vertical arm of brace 26a to the horizontal arm of guide 18a for relative vertical adjustment, such end has a bracket 27a welded thereto. This bracket has vertical slots which receive the clamping bolts 28a that are carried by member 18a. The member 27a slidably fits into a notch 270a formed on the face of the horizontal part of the guide 18a.

Actuation of unit 4a will reciprocate rod 19a horizontally in the guide 18a. This will move the slotting tool 24a, carried by the rod 19a, back and forth relative to the work and, thereby, produce the desired slot therein. The work may be adjusted relative to the slotter by adjustment of the carriage 3a.

It will be apparent that I have provided a simple, low cost slotter attachment which can be easily applied to or removed from a standard milling machine. The attachment will be very efficient for horizontal or vertical slotting operations.

The invention described herein may be manufactured and used by or for the Government of the United States of America for governmental purposes without the payment of any royalty thereon or therefor.

What I claim is:

1. An attachment for a milling machine or the like having a vertical column with a vertically adjustable bed disposed on the forward side thereof and a spindle carried by the column and projecting forwardly thereof, a horizontal supporting arm removably secured to the top of the column by a bolt and slot connection for horizontal adjustment relative thereto and projecting forwardly therefrom, a guide removably bolted to the forward end of said arm and extending downwardly therefrom, a tool-carrying rod reciprocably mounted in said guide, crank mechanism for operably connecting said spindle to said rod to cause reciprocation thereof, said crank mechanism being adjustably connected to both the spindle and the rod so that the stroke of the rod can be varied, and a brace having one end removably secured to said guide and its other end removably secured to said bed.

2. An attachment for a milling machine or the like having a vertical column and a spindle carried by said column and projecting forwardly thereof, a horizontal supporting arm adjustably secured to said column and projecting forwardly therefrom, a guide removably secured to the forward end of said arm, a tool-carrying rod reciprocably mounted in said guide, and a crank mechanism for operably connecting said spindle to said rod to cause reciprocation thereof, said crank mechanism being adjustably connected to both said spindle and the rod.

3. An attachment for a milling machine having a vertical column with a vertically adjustable bed disposed on the forward side thereof and a spindle carried by the column and projecting forwardly thereof, a horizontal supporting arm removably secured to the top of the column for horizontal adjustment relative thereto and projecting forwardly therefrom, a guide member adjustably secured to said arm, a tool carrying rod reciprocably mounted in said guide member, an adjustable crank mechanism for operably connecting said spindle to said rod to cause reciprocation thereof, said crank mechanism comprising, a crank arm member secured to and radially adjustable from said spindle, a pivot pin, said crank arm having a plurality of spaced openings therein each adapted to receive said pivot pin, a crank pin, a plurality of spaced openings in said tool-carrying rod each adapted to receive said crank pin, and a pitman operably connecting said pivot pin and said crank pin.

4. Apparatus in accordance with claim 1 having a guide, a tool-carrying rod reciprocably mounted in said guide, and a crank mechanism for operably connecting said spindle to said rod to cause reciprocation thereof, said crank mechanism comprising a cylindrical member removably secured to said spindle and having a dovetail groove in one face thereof, a crank arm cooperatively engaged and adjustably secured in said groove, a pivot pin, said crank arm having a plurality of spaced openings therein each adapted to receive said pivot pin, a crank pin, a plurality of spaced openings in said tool-carrying rod each adapted to receive said crank pin, and a pitman operably connecting said pivot pin and said crank pin, whereby the stroke of said tool-carrying rod can be varied.

5. An attachment for a milling machine having a vertical column with a vertically adjustable bed disposed on the forward side thereof and a spindle carried by the column and projecting forwardly thereof, a horizontal supporting arm removably secured to the top of the column for horizontal adjustment relative thereto and projecting forwardly therefrom, an L-shaped guide removably bolted to the forward end of said arm, one leg of said guide extending downwardly therefrom and the other leg extending transversely of said bed, a tool carrying rod reciprocably mounted in the transverse leg of said guide, crank mechanism for operably connecting said spindle to said rod to cause reciprocation thereof, said crank mechanism being adjustably connected to both the spindle and said rod so that the stroke of the rod can be varied, and a brace having one end adjustably secured to said transverse leg to permit vertical movement thereof and its other end removably secured to said bed.

HOWARD A. WILSON.

REFERENCES CITED

The following references are of record in the file of this patent:

UNITED STATES PATENTS

| Number | Name | Date |
|---|---|---|
| 360,530 | Kaufholz | Apr. 5, 1887 |
| 660,200 | Richards | Oct. 23, 1900 |
| 1,366,005 | Jansson | Jan. 18, 1921 |
| 1,367,680 | Allen | Feb. 8, 1921 |
| 1,412,915 | Boker | Apr. 18, 1922 |
| 1,661,509 | Skinner | Mar. 6, 1928 |

FOREIGN PATENTS

| Number | Country | Date |
|---|---|---|
| 588,397 | France | May 6, 1925 |
| 601,038 | France | Feb. 20, 1926 |